(12) United States Patent
Friesen et al.

(10) Patent No.: US 12,438,726 B2
(45) Date of Patent: Oct. 7, 2025

(54) METHOD FOR CHECKING CRYPTOGRAPHIC SECRETS FOR EQUALITY

(71) Applicant: MERCEDES-BENZ GROUP AG, Stuttgart (DE)

(72) Inventors: Viktor Friesen, Karlsruhe (DE); Viktor Pavlovic, Stuttgart (DE); Philipp Weber, Hardheim (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 197 days.

(21) Appl. No.: 18/276,279

(22) PCT Filed: Jan. 27, 2022

(86) PCT No.: PCT/EP2022/051828
§ 371 (c)(1),
(2) Date: Aug. 8, 2023

(87) PCT Pub. No.: WO2022/171446
PCT Pub. Date: Aug. 18, 2022

(65) Prior Publication Data
US 2024/0121102 A1    Apr. 11, 2024

(30) Foreign Application Priority Data
Feb. 9, 2021    (DE) .................... 10 2021 000 645.3

(51) Int. Cl.
*H04L 9/32*    (2006.01)
*H04L 9/06*    (2006.01)
*H04L 9/08*    (2006.01)

(52) U.S. Cl.
CPC .......... *H04L 9/3236* (2013.01); *H04L 9/0643* (2013.01); *H04L 9/0656* (2013.01); *H04L 9/0877* (2013.01)

(58) Field of Classification Search
CPC ... H04L 9/3236; H04L 9/0643; H04L 9/0656; H04L 9/0877; H04L 9/3242; H04L 63/123
See application file for complete search history.

(56) References Cited

U.S. PATENT DOCUMENTS 7,325,132 B2    1/2008    Takayama et al.
10,142,311 B2    11/2018    Oshida
(Continued)

FOREIGN PATENT DOCUMENTS

JP    2004304751 A    10/2004
JP    2010178394 A    8/2010
(Continued)

OTHER PUBLICATIONS

International Search Report and Written Opinion mailed May 6, 2022 in related/corresponding International Application No. PCT/EP2022/051828.
(Continued)

*Primary Examiner* — Mohammed Waliullah
(74) *Attorney, Agent, or Firm* — PATENT PORTFOLIO BUILDERS PLLC

(57) ABSTRACT

A method for checking cryptographic secrets for equality involves at least one of the secrets being stored in a read-protected manner in a secure system. The at least one secure system has a cryptographic hash value interface. For checking purposes, a hash value of the secret provided with a salt or with the hash value of a salt is output via the interface for comparison with a corresponding hash value of another secret provided with the salt or with the hash value of the salt.

11 Claims, 2 Drawing Sheets

(56) References Cited

U.S. PATENT DOCUMENTS

| | | | | |
|---|---|---|---|---|
| 2004/0205341 A1* | 10/2004 | Brickell | ............... | H04L 9/3271 |
| | | | | 713/168 |
| 2014/0032922 A1* | 1/2014 | Spilman | ............... | G06F 21/602 |
| | | | | 713/184 |
| 2017/0366527 A1* | 12/2017 | Oxford | ................ | H04L 9/3242 |
| 2018/0367309 A1* | 12/2018 | Reinhold | ............ | H04L 9/0662 |
| 2020/0259651 A1* | 8/2020 | Mohassel | ............. | H04L 9/3218 |

FOREIGN PATENT DOCUMENTS

| | | | | |
|---|---|---|---|---|
| JP | 2013138491 A | 7/2013 | | |
| JP | 2016158204 A | 9/2016 | | |
| WO | WO-2007148258 A2 * | 12/2007 | ............ | G06F 21/57 |
| WO | WO-2020145944 A1 * | 7/2020 | ............ | G06F 21/32 |

OTHER PUBLICATIONS

Office Action created Dec. 14, 2021 in related/corresponding DE Application No. 10 2021 000 645.3.

Office Action dated Sep. 10, 2024 in related/corresponding JP Application No. 2023-546225.

Takemori et al. "Protection for Automotive Control System Using Secure Boot and Authentication," Technical research report of electronic Information Communication Engineers, Japan, Jan. 12, 2014, vol. 114. No, 225, pp. 47-54.

Office Action dated Feb. 4, 2025 in related/corresponding KR Application No. 10-2023-7025535.

* cited by examiner

METHOD FOR CHECKING CRYPTOGRAPHIC SECRETS FOR EQUALITY

BACKGROUND AND SUMMARY OF THE INVENTION

Exemplary embodiments of the invention relate to a method for checking cryptographic secrets for equality, wherein at least one of the secrets is stored in a read-protected manner in a secure system.

Today, modern vehicles are part of a large information technology vehicle ecosystem. A central part of this vehicle ecosystem is the so-called vehicle backend, or backend for short. This is a server typically operated by the vehicle manufacturer, to which the vehicles are connected and via which they can network with the Internet, for example, or with one another. The communication connection between the backend and the vehicle is secured with the help of known standard methods of information security. These are usually TLS, sometimes also IPSec. All these standard methods are based on so-called asymmetric cryptography, such as ECC or RSA. The vehicle ecosystem can comprise further components, such as individual control units installed in the vehicles, or smartphones with applications running thereon, which are made available by the vehicle manufacturer, for example, and which communicate both with the vehicle or its control units as well as with the backend. The communication within the vehicle can take place, for example, via WLAN or Bluetooth, the vehicle-external communication typically via standard cellular networks. Further components of the vehicle ecosystem can also be manufacturer-specific external devices, such as so-called OBD dongles, which usually communicate exclusively with the vehicles via a hardware interface. These communication relationships are also usually secured with the aid of asymmetrical cryptographic methods, for example in turn via TLS or IPSec.

In addition, however, there are also cases in which it is more efficient or, due to the safety requirements, is also necessary to equip two or more subscribers of the vehicle ecosystem in a secure manner with shared secrets, which can subsequently be used to secure the communication between these subscribers with the help of cryptographic methods based on shared secrets, typically so-called symmetrical cryptography. Examples of shared secrets and cryptographic methods based thereon may be, for example, shared 128-bit keys with AES for encryption, 256-bit keys with HMAC for authentication or integrity, or individual passwords for password authentication.

Such shared secrets are then easily protected in the systems using these secrets against unauthorized access, and here in particular against unauthorized read access. This can be achieved by only providing interfaces for local calls of cryptographic operations using those secrets, but not for reading the secrets themselves. Furthermore, such secrets are protected as well as possible against reverse engineering, for example by software-based obfuscation techniques or the use of a hardware security module (HSM) as a secure system in which the secrets are stored. The secrets subsequently no longer leave this system.

The advantage of this procedure is that if a hardware security module is used, nobody, especially not an attacker who has full access to the system, has access to the value of the secret and can obtain it in plain text with reasonable effort. All cryptographic operations in which the key is used are also carried out within the secure system, such as the HSM. However, a disadvantage of this procedure is the increased difficulty of troubleshooting in the event of failures of a cryptographic operation. Such an error can occur, for example, when the recipient decrypts or checks the message authentication code (MAC) or the password. If, for example, the decryption, integrity check or authentication at the recipient fails, the suspicion naturally arises that the secret used by the sender, for example the key with which the message was encrypted and/or authenticated and the key with which the message was decrypted by the recipient and/or with the help of which its integrity is checked, differ from each other. The suspicion is obvious in particular if, and thus it is quite sensible for safety reasons, a secret is regularly renewed, that is to say, for example, exchanged or newly negotiated. If no successful operation has been carried out with such a recently renewed secret up to this point in time, the suspicion of the error very quickly lies in the secret. However, if the affected secret is stored by at least one of the communication partners involved in a secure system such as the above-mentioned HSM, it is not easy to check whether all affected partners use the same secret. The value of this secret, which is securely stored in the system, cannot be read out easily, and that is how it is intended. This means that reading out is generally not possible, even in a debug situation, despite full access to the system or device.

One possible approach for such an equality check could be the use of a cryptographic hash function. Instead of the secret itself, a hash of this secret could then be read out. In this way, hash values of different instances of the same secret can then be read out from different secure systems or from different systems, of which at least one is secure, and then checked for equality by comparing the hash values. This has the advantage that the key or the secret itself cannot be read out and, typically, cannot be deduced from the cryptographic hash value either.

US 2017/0366527 A1 uses the formation of hash values and comparison thereof to secure secrets during provisioning and thus enables the creation of a security indicator which, in the event that the equality of a preset value from the outside and a hash value generated from a key, activates a "secure flag."

However, the procedure is particularly problematic when the secret in question, for example a password, does not have enough entropy because it is, for example, too short or has certain known patterns. In this case, it is possible, for example, to be able to infer the secret from the hash value, for example using common attack options known in the IT field, such as a brute force attack, a dictionary attack, or an attack with a rainbow table.

Exemplary embodiments of the present invention are directed to a suitable method for checking cryptographic secrets for equality, in which the secrets themselves remain secret and nevertheless, with high security against external attacks, a comparison of secrets is possible.

The method according to the invention for checking cryptographic secrets for equality uses at least one secret that is stored in a read-protected manner in a secure system which, according to an extremely favorable development of the method according to the invention, can be designed as a hardware security module (HSM). The at least one secure system, for example the HSM, now has a hash value interface. A cryptographic hash value of the secret stored in the secure system can be read out via this interface. In addition, the secure system is able to provide the secret with a so-called salt or with the hash value of such a salt before creating the hash value. The cryptographic hash value is then created by the secret and the added salt or its hash value in order to correspondingly impede an attack on this secret, for example via a rainbow table, since the creation thereof would then become extremely complicated and expensive, so that this effort is not worthwhile.

It is particularly efficient if the salt, which, in fact, represents a non-secret value by general definition, is not specific externally and is preferably also not fixed for all queries. The salt should therefore be created in the secure system as possible and freely chosen. In this way, it is possible to ensure that the secure system in which the secret is stored in a secure manner against reading out uses only secure salts at all times. It is essential that the salts always have a sufficient length and differ sufficiently. It is now problematic that, however, the salt then adds something to the secret to be stored, which is not necessarily the same in different systems, and is typically not the same if the salt is specified by the system itself. The increased security thus calls into question the verification of equality.

According to an extraordinarily favorable development of the method according to the invention, it is therefore provided that the salt is constructed as a multi-part salt, wherein a salt portion is determined by the at least one secure system and wherein the other salt portions are transmitted to the secure system.

It is therefore possible to utilize the possibility of using the secure system to generate a salt that is very secure with regard to known attacks, and according to an extremely favorable development of the method according to the invention, this can always be generated anew as a self-determined salt portion and in particular always via a secure random number generator. The other salt portions are then transmitted to the secure system.

Another very favorable embodiment of the method according to the invention can also provide for the salt portion self-determined by the secure system to be disclosed before the hash value of the secret is formed. As a result, the salt portion of the secure system preferably generated in each case for the respective situation is known, for example for a comparative instance, which in turn can transmit the externally determined portions to the secure system.

Another very advantageous embodiment provides that the order in which the portions of the salt and the secret are concatenated is specified in the secure system or is specified externally. This order of the secret and the portions of the salt have a decisive influence on the hash value of the combination of salt and secret. The order can, for example, be specified externally, whereby theoretically the same order can always be used; for example, self-determined salt, externally determined salt and secret in one system and a corresponding structure with the reverse order of the salt portions in the other system, so that the same cryptographic hash value for the combination of secret and salt portions is generated by both systems and can be reliably compared.

A very favorable embodiment provides that the salt itself is designed as a two-part salt with a self-determined salt portion and an externally determined salt portion. In this case, the comparison of two secrets is possible, wherein the method can be repeated as often as desired in order, for example, to compare several secrets of several instances involved, in particular in the context of a debugging process.

When checking several secrets stored in different secure systems for equality, according to an extremely favorable development of the method according to the invention, the procedure can now be such that in a first system, the self-determined salt portion thereof is requested, after which this is transmitted to a further system, which transmits its self-determined salt portion together with a hash value of its secret and the two salt portions, wherein the self-determined salt portion of the further system is reported back to the first system as an externally determined salt portion, which first system in turn determines a hash value from its secret and the two salt portions, after which the hash values transmitted by both systems are compared. Thus, the equality of the secrets can be checked reliably and efficiently, in particular in the debugging procedure already mentioned several times.

Here in particular, a hash value of the concatenated salt portions can now be used instead of the salt in accordance with a very advantageous development of the solution according to the invention. The secret is then provided with this hash value of the already concatenated and hashed salt portions and hashed again. The comparison is based on this second hash value. This can increase security against chosen plaintext attacks.

According to a further development of the method according to the invention, it can be provided that in the order of concatenations of the first system, the salt portions are swapped with those of the further system, which means that at least the first system receives the order as an external specification. The order is then always the order "seen" by the respective secure system. If a fixed order of concatenation is specified, this can be carried out accordingly without further measures. According to a very advantageous development of this idea, the further system can preferably determine the order itself and disclose it accordingly, for example transmit it together with its self-determined salt portion and the hash value of the secret and the two salt portions. This order, which is self-determined by the further system, then serves as an externally specified order transmitted to the first system. If the order of the salt portions is swapped over from the point of view of the respective secure system, it is ensured in any case that the cryptographic hash values of the secrets match the two salt portions with the highest possible security if the secrets in the two secure systems do so likewise. It is accordingly provided that self-determined salt portions, preferably of sufficient length and/or entropy, are always generated and used, so that the externally specified salt portion for one system is more or less the self-generated salt portion of the other system, so that no fixed values and completely external specifications for the salts are permitted, which further increases the security of the method.

By using a self-determined salt portion in this way, it is possible to prevent the category of so-called chosen plaintext attacks, since such potential chosen plaintext attacks are made more difficult by using self-determined salt portions. Other possibilities of attack are also massively restricted as a result, for example an attack via a rainbow table, since such a system would require its own rainbow table for each salt, which can hardly be realized for reasons of economic efficiency alone, in particular when the salt used or its portions have a sufficient length or entropy.

Instead of a conventional cryptographic hash function in order to determine the hash value of the secret and the salt portions, a complex cryptographic one-way function based on hash functions, for example an HMAC or a so-called key derivation function (KDF), can be used according to an extraordinarily favorable development of the method according to the invention. The hash value is then calculated accordingly via this function, which is accompanied by further security advantages compared to a conventional calculation of hash values, for example via SHA-256.

In this case, two secrets can each be compared with one another via the hash values of the respective secrets and salts. For several secrets, this could then be repeated iteratively. However, it is also possible to compare three or more secrets directly using the method. Due to the increasing number of possibilities for concatenating the secrets and salts or salt portions with a higher number of secrets, the order of concatenation preferably specified here and its implementation in the secure systems involved are of increasing importance.

A further very favorable embodiment of the method according to the invention further provides that a secure configuration option for the individual partial functions of the cryptographic hash interface is provided in the secure system, for example the HSM, via which at least the subsequent settings can be configured in a tamper-proof manner. These settings should comprise at least one or preferably all of the questions:
- is a self-determined salt portion used?
- is the self-determined salt portion disclosed to the environment before the hash value is created?
- is an externally determined salt portion used?
- how many externally determined salt portions are used?
- is the order of concatenation defined in the secure system or can it be specified externally?
- in the order of concatenation, does the secret always come at a specified point, in particular first?
- is the salt consisting of the concatenated salt portions pre-hashed?
- is the secret pre-hashed?

By means of these different stipulations, the systems for use with the method according to the invention can be adapted, for example, to one another or to a predetermined test strategy. Depending on the configuration of the corresponding interface, systems that are basically identical can be designed differently just by the configuration, which increases security even further. In particular, the last question could be omitted, e.g., if the pre-hashing of the secrets is specified as the usual procedure.

Further advantageous refinements of the method according to the invention also result from the exemplary embodiments which are described in more detail below with reference to the figures.

BRIEF DESCRIPTION OF THE DRAWING FIGURES

DETAILED DESCRIPTION

Figure 1:
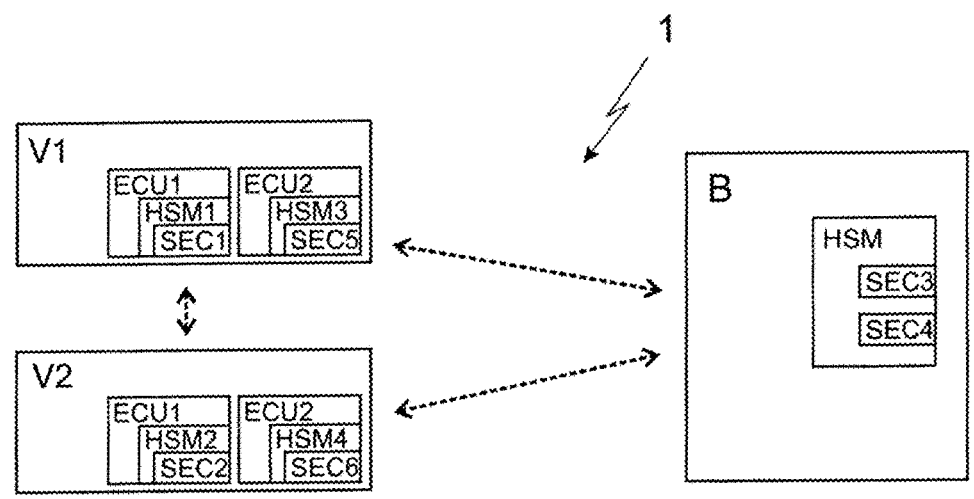
FIG. 1 is a schematic representation of split secrets in a vehicle ecosystem.

In the illustration of FIG. 1, a vehicle ecosystem 1 or a section of such a system is shown schematically. The illustrated section comprises two exemplary vehicles V1 and V2, each having two control units ECU1 and ECU2. In addition, a vehicle backend B is indicated, which is often also referred to as backend for short. The backend B is now able to communicate with the vehicles V1, V2 or their control units ECU1, ECU2. For this purpose, it has a secure system in the form of a hardware security module HSM, in which two secrets SEC3 and SEC4 are stored accordingly in this exemplary embodiment. In the two vehicles V1, V2, the corresponding secrets SEC5 and SEC6 are stored there, for example in the respective second control unit ECU2, in hardware security modules HSM3 and HSM4 there. In the exemplary embodiment of the section from the vehicle ecosystem 1 shown here, the two vehicles V1, V2 are also intended to be able to communicate with one another. Purely by way of example, the two first control units ECU1 are used for this purpose with their hardware safety modules HSM1 in the first vehicle V1 and HSM2 in the second vehicle V2. The corresponding secrets are then denoted by SEC1 and SEC2.

If there is now a difficulty in one of the communications, which can be traced back to the cryptographic method, there can always be a problem with the respective secret SEC1, SEC2. For the following exemplary embodiment, it should therefore be explained how easily, securely, and nevertheless efficiently the two secrets SEC1 and SEC2 in the respective hardware security modules HSM1 and HSM2 of the control units ECU1 of the two vehicles V1, V2 can be checked for equality, without having to read out the secrets SEC1, SEC2 themselves, which is typically not possible in secure systems, even in the case of full access during a debugging process.

Instead of reading out the secrets SEC1, SEC2 themselves, hash values HASH1, HASH2 of these secrets SEC1, SEC2 are therefore read out. To generate the hash values HASH1, HASH2, common functions for generating hash values can be used, for example SHA-256. However, instead of such a conventional cryptographic hash function, which is used below for the description of the exemplary embodiments, a more complex cryptographic one-way function based on cryptographic hash functions can also be used; for example, HMAC or a key derivation function KDF. In this case, for example, the function HMAC(SEC, SALT) or KDF(SEC,SALT, iterations) would take the place of determining a hash from a secret and a salt HASH(SEC||SALT). The iterations here should be understood to mean a freely selected natural number which defines the number of application repetitions of the key derivation function.

Figure 2:
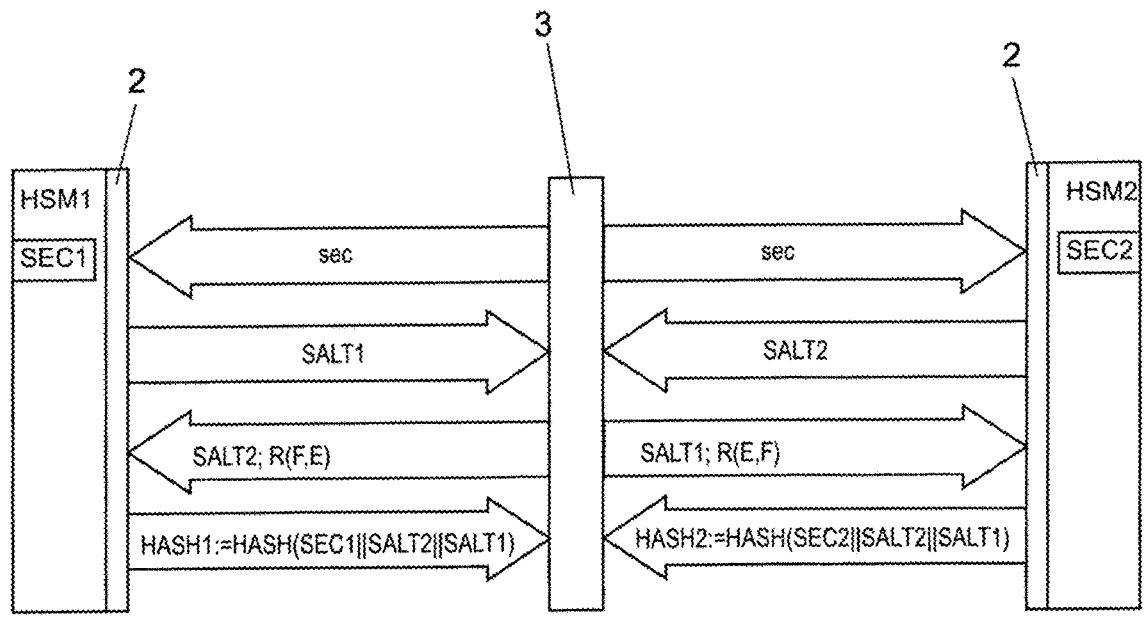
FIG. 2 is a schematic representation of the sequence in a first exemplary embodiment of the method according to the invention.

In the exemplary embodiment described below with reference to FIG. 2, a secret SEC1, SEC2 in two different hardware security modules, HSM1, HSM2 is now to be checked for equality. A test unit denoted by 3 in the illustration in FIG. 2 is used for this purpose. The two hardware security modules HSM1, HSM2 each have a hash value interface 2, each of which has implemented all of the above properties or can be configured accordingly. This interface 2 thus enables both the advance query of the self-determined salt portions and the possibility of determining the order of concatenation of the salt portions. The test unit 3 then designates a system which is designed to check the equality of the secrets SEC1, SEC2 stored in the two hardware safety modules HSM1, HSM2.

The sequence in detail is as follows and is also found in the illustration in FIG. 2 by the corresponding communication arrows between the test unit 3 and the interfaces 2 or the hardware security modules HSM1 and HSM2 equipped therewith.

1. The test unit 3 simultaneously transmits to the hardware security module HSM1 and to the hardware security module HSM2 the identifier sec of the respective secret SEC1, SEC2, the hash value of which it would like to receive to check the identity of the secrets SEC1, SEC2. In addition, the request is sent to disclose the intrinsic portion of the salt to be used in each case.
2. The two hardware security modules HSM1 and HSM2 each generate a new random intrinsic salt portion of sufficient length, for example with 256 bits each. The intrinsic portions SALT1 of the hardware security module HSM1 and SALT2 of the hardware security module HSM2 are then transmitted to the test unit 3, as can be seen in the illustration in FIG. 2.

3. The test unit 3 defines the order R in which the salt portions are to be concatenated. F stands for the externally determined salt portion, E for the self-determined salt portion.
4. The test unit 3 transmits the respectively externally determined salt portions SALT2, SALT1 to the respective hardware security module HSM1, HSM2. The hardware security module HSM1 thus receives the salt portion SALT2 self-determined by the hardware security module HSM2 as an externally determined salt portion, as well as the order of concatenation, in this case R(F, E). The other hardware security module HSM2 accordingly receives intrinsic salt portion SALT1 of the first hardware security module HSM1 as an external salt portion F and accordingly the reversed order R of the salt portions, since the intrinsic salt portion E is SALT2 for the second hardware security module HSM2.
5. The first hardware security module HSM1 now forms a hash value with the concatenation according to the predetermined order R, i.e., HASH1:=HASH (SEC1∥SALT2∥SALT1). The second hardware security module HSM2 determines its hash value HASH2:=HASH (SEC2∥SALT2∥SALT1). These two hash values HASH1 and HASH2 are then transmitted to the test unit 3.
6. The test unit 3 checks the two received hash values HASH1 and HASH2. The two secrets SEC1 and SEC2 are exactly the same if the received hash values HASH1, HASH2 are the same. If there are discrepancies here, the secrets SEC1, SEC2 are obviously not the same and the error that was searched for can be located in the area of these secrets SEC1, SEC2.

Figure 3:
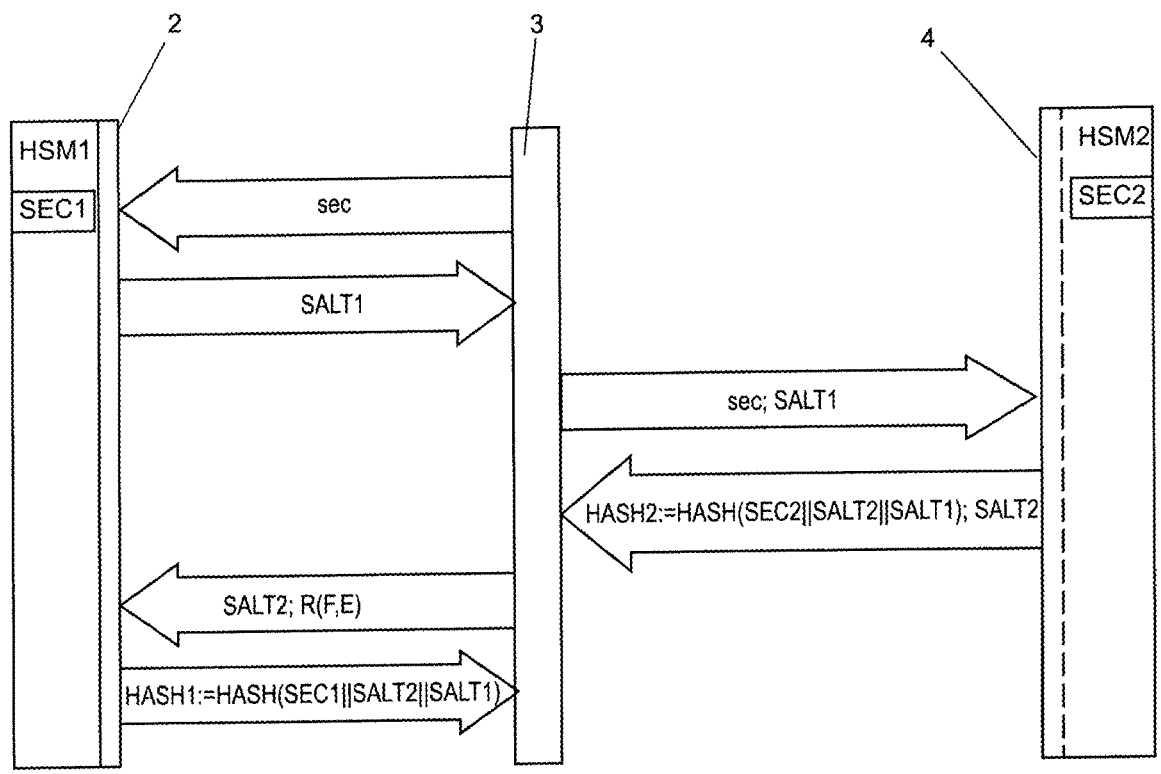
FIG. 3 is a schematic illustration of an alternative sequence of the method according to the invention.

The following second exemplary embodiment is substantially analogous. A secret SEC1, SEC2 with the identifier sec is stored in a respective hardware security module HSM1, HSM2. In this case, it is such that only the first hardware security module HSM1 has the interface 2, which implements all of the properties mentioned above, in particular allowing both the advance query of the self-determined salt portion used and the possibility of specifying the order of concatenation of the two salt portions. By contrast, the further hardware security module HSM2 is only able to receive an externally determined salt portion via a simpler interface 4 and to process it immediately if the order R of the concatenation is previously established, for example intrinsic salt portion, external salt portion R(E,F) with a prefixed secret from the point of view of the second hardware security module HSM2. FIG. 3 then describes the sequence analogously to the illustration in FIG. 2.

1. The checking unit 3 transmits to the first hardware security module HSM1 the identifier sec of the secret SEC1, the hash value HASH1 of which it would like to receive, together with the request to disclose the intrinsic salt portion SALT1 to be used.
2. The first hardware security module HSM1 generates a new random intrinsic salt portion SALT1 of sufficient length and delivers it to the test unit 3.
3. The test unit 3 transmits the identifier sec of the secret SEC2 to the second hardware security module HSM2, the hash value of which it would like to receive, together with the intrinsic salt portion SALT1 received from the first hardware security module HSM1 and the request to calculate the hash value and to transmit this together with the intrinsic salt portion SALT2 used for this purpose.
4. The second hardware security module HSM2 generates a new random salt intrinsic portion SALT2 of sufficient length, calculates the requested HASH value as HASH2:=HASH (SEC2∥SALT2∥SALT1) and transmits the hash value HASH2 together with the intrinsic salt portion SALT2 used during its calculation to the test unit 3.
5. The test unit 3 now transmits to the first hardware security module HSM1 the external salt portion SALT2 to be used and the order R of concatenation R(F, E) to be used, this time from the point of view of the first hardware security module HSM1, that is to say with a swapped external salt portion and salt intrinsic portion.
6. The first hardware security module HSM1 calculates its hash value HASH1:=HASH (SEC1∥SALT2∥SALT1) and transmits this hash value HASH1 to the test unit 3.
7. The test unit 3 checks the two received hash values HASH1 and HASH2 for equality. The secrets SEC1 and SEC2 are exactly the same if the received hash values HASH1, HASH2 are the same, comparable to above.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:
1. A method, comprising:
    storing at least one of cryptographic secret of at least two cryptographic secrets in a read-protected manner in at least one secure system; and
    checking the at least two cryptographic secrets for equality,
    wherein the at least one secure system has a cryptographic hash value interface,
    wherein the checking of the at least two cryptographic secrets involves outputting, via the cryptographic hash value interface 1) a hash value of the at least one cryptographic secrets provided with a salt for comparison with a corresponding hash value of another one of the at least two cryptographic secrets provided, or 2) a hash value of a salt for comparison with the hash value of the salt,
    wherein the salt is a multi-part salt, wherein a salt portion is self-determined by the at least one secure system and other salt portions are transmitted to the secure system and wherein when checking several cryptographic secrets stored in different secure systems for equality, the method further comprises in a first secure system, the self-determined salt portion is requested, after which the self-determined salt portion is transmitted to a further secure system, the further secure system transmits its self-determined salt portion together with a hash value of its cryptographic secret and the two salt portions, wherein the self-determined salt portion of the further secure system is reported back to the first secure system as an externally determined salt portion, wherein the first secure system determines a hash value from its cryptographic secret and the two salt portions, after which the respective hash values of the cryptographic secrets and the two salt portions transmitted by the first and further secure systems for checking are compared.

2. The method of claim 1, further comprising:

disclosing the self-determined salt portion before the hash value of the secret provided with the salt portions is formed.

3. The method of claim 1, wherein an order in which the self-determined and other salt portions and the secret are concatenated in the at least one secure system is specified in the at least one secure system itself or is specified externally of the at least one secure system.

4. The method of claim 1, wherein in an order of concatenation of the first secure system, the two salt portions are swapped with respect to order of concatenation which the further secure system used, and at least the first secure system uses the order of concatenation as a received external specification.

5. The method of claim 4, wherein the further secure system defines the order of concatenation itself and discloses the order of concatenation.

6. The method of claim 4, wherein the at least one cryptographic secret is provided with a hash value of the concatenated salt portions instead of the salt and the comparison is based on the hash value of this combination.

7. The method of claim 1, wherein the self-determined salt portion is always newly generated by a secure random number generator.

8. The method of claim 1, wherein the at least one self-determined salt portion is always used.

9. The method of claim 1, the hash value is generated using a complex cryptographic one-way function based on hash functions.

10. The method of claim 1, wherein the at least one secure system is a hardware security module.

11. The method of claim 1, wherein the at least one secure system is provided with a communication interface via which the cryptographic hash interface is configurable in a tamper-proof manner with regard to at least one of the following partial functions:

using a self-determined salt portion;

disclosing the self-determined salt portion to the environment before the hash value is created;

using an externally determined salt portion;

using a number of externally determined salt portions;

defining the order of concatenation the secure system or defining the order of concatenation externally;

the secret always coming at a specified point in the order of concatenation;

using the salt consisting of the concatenated salt portions pre-hashed; and using the secret pre-hashed.

* * * * *